Jan. 27, 1953     D. H. MONTGOMERY     2,626,449
STOCK FEED MECHANISM
Filed April 5, 1948
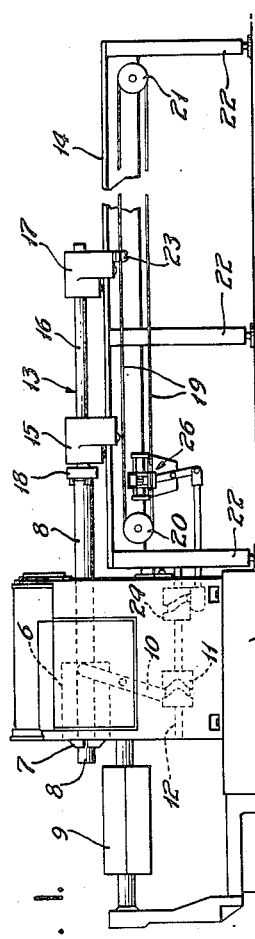
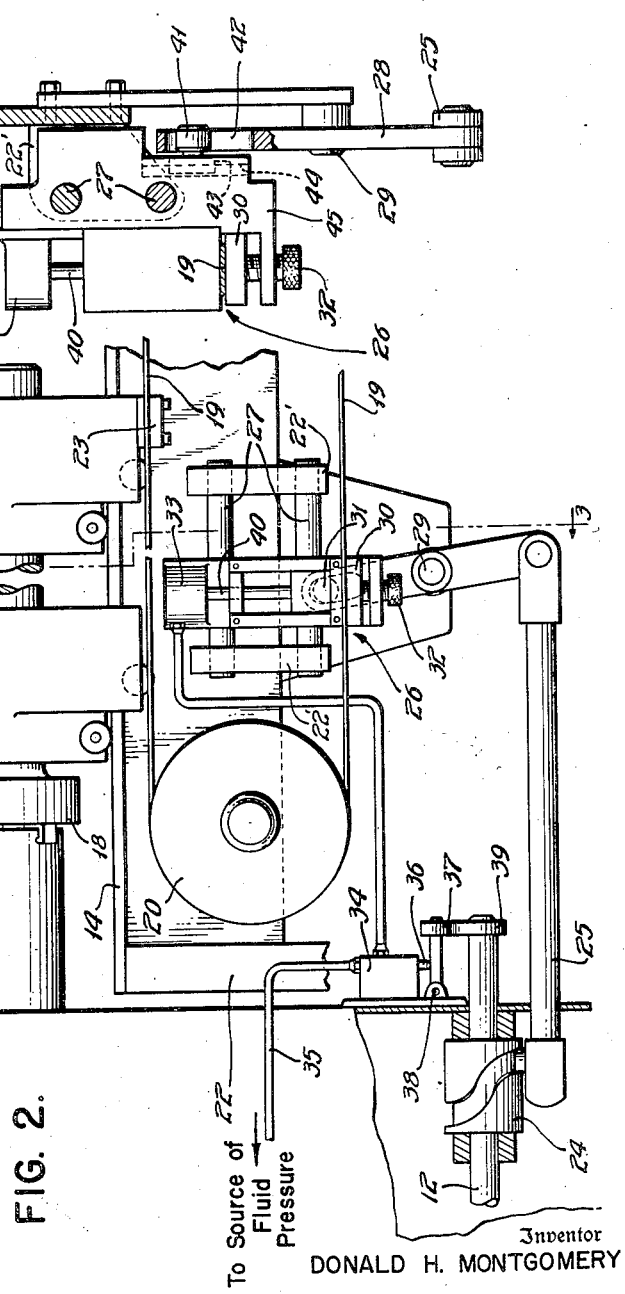
Inventor
DONALD H. MONTGOMERY
By Mitchell Berhert
Attorneys Patented Jan. 27, 1953

2,626,449

UNITED STATES PATENT OFFICE 2,626,449

STOCK-FEED MECHANISM

Donald H. Montgomery, West Hartford, Conn., assignor to The New Britain Machine Company, New Britain, Conn., a corporation of Connecticut Application April 5, 1948, Serial No. 18,900

7 Claims. (Cl. 29—59)

My invention relates to stock-feeding mechanisms, as for feeding stock to the collet or chuck of an automatic lathe.

It is an object of the invention to provide an improved device of the character indicated.

It is another object to provide an improved stock-feeding mechanism that may positively advance stock into a machine of the character indicated in equal feed increments, regardless of the usable unconsumed remainder of stock to be fed.

It is also an object to provide an improved stock-feeding mechanism operating automatically in timed relation with the collet-actuating means of the machine to be fed.

It is a more specific object to provide a stock-feeding mechanism of the character indicated wherein a metal tape is employed in the application of thrusting forces.

It is in general an object to meet the above objects with a mechanism that is inherently simple and that is not likely to get out of order.

Other objects and various further features of the invention will be pointed out or will occur to those skilled in the art from a reading of the following specification in conjunction with the accompanying drawings. In said drawings, which show for illustrative purposes only, a preferred form of the invention:

Fig. 1 is a side view of a machine to which a stock-feed mechanism has been applied in accordance with the invention;

Fig. 2 is an enlarged fragmentary view to illustrate certain details of the mechanism of Fig. 1; and Fig. 3 is a sectional view taken substantially along the line 3—3 of Fig. 2.

Briefly stated, my invention contemplates an improved stock-feeding mechanism wherein a metal tape is employed positively to feed the stock in equal increments. The mechanism includes pusher means to engage the end of stock to be fed, and the pusher means may be guided in longitudinally extending guide means. A feed tape, which may be an endless tape stretched between longitudinally spaced pulleys, is connected to feed the pusher means, and equal feed increments may be imparted to the tape. In the feed mechanism to be described, the pusher means is clamped to the tape, and cam means on the machine to be fed supply a reciprocating motion to a releasable two-way engaging clamp on the tape, so that feed may be imparted to the tape in only one direction for a full cycle of the cam means. The cam means may be operated in timed relation with the collet-actuating means.

Referring to the drawings, my invention is shown in application to the stock-feeding mechanism for an automatic lathe 5. The lathe 5 may include a spindle 6 with a collet 7 for revolubly supporting and chucking stock 8, which in the form shown is internally fed into the back end of the machine. A tool slide 9 may support tools (not shown) for performing end-working or turning operations on the forwardly projecting end of the stock 8. The collet 7 may be automatically actuated by a collet-actuating mechanism including a cam follower in the form of a lever 10 to follow the slot in a chucking cam 11 on the main camshaft 12 of the machine 5.

The stock-feeding mechanism for automatically advancing the stock 8 in a timed relation with operation of the collet-actuating mechanism may include pusher means 13 to be longitudinally guided by guide means in the form of a longitudinally extending girder 14 of T-section. The pusher means 13 preferably includes supporting means, such as a forward carriage 15, to be guided by the guide means 14 and longitudinally slidable with respect to the main body (that is, the bar portion 16) of the pusher means 13. The forward carriage 15 may be detachably latched in the forward position shown, by means not indicated. Feed forces are preferably applied directly to the bar 16, as through a rear supporting carriage 17 in longitudinally locked relation with the bar 16 and also guided by the guide means 14.

When the pusher means 13 is fed to a point where the forward carriage 15 abuts the forward end of, say, the guide means 14, the forward carriage 15 may be unlatched and the bar 16 extended through the forward carriage 15, so as to feed the butt of the stock 8 well into the collet 7. If desired, the stock 8 may be fed in this manner as long as there remains a usable length of unconsumed stock. In the form shown, a chuck 18 on the forward end of the pusher means 13 is carried by the bar 16, and the chuck 18 positively grips the butt end of the stock 8. The stock-feeding mechanism which has thus far been described is generally similar to a mechanism explained in fuller detail in my copending application Serial No. 792,976, filed December 20, 1947, and now Patent No. 2,555,753, granted June 5, 1951.

In accordance with the invention, a metal tape 19 is employed to feed the stock-feeding mechanism which has been described, and the tape includes a longitudinally extending part connected to feed the pusher means 13. In the form shown, the tape 19 is endless and stretched over longitudinally spaced pulleys 20—21 journalled in a frame 22, and the upper length of the tape 19 may be permanently attached, as at 23, to the rear or stock-feeding carriage 17 of the pusher means 13.

As intimated above, the tape 19 may be advanced in positive equal feed increments by a mechanism operating in timed relation with operation of the collet-actuating means of the machine 5. In the form shown, cam means including a feed cam 24 are employed to provide a reciprocating feed motion in a cam follower 25. The cam 24 may be mounted on the same camshaft (that is, on the main camshaft 12) as the chucking cam 11. In the preferred form shown, the cam follower 25 is connected to feed the tape 19 through a releasable two-way engaging clamp or gripping mechanism, designated generally 26, and the mechanism 26 is supported for a longitudinal sliding motion in guides 27 fixed to the frame 22, as by bracket 22'. The cam follower 25 may be connected to the clamping mechanism 26 through a reversing link 28, pivoted as at 29, on a pin that is also supported on the frame of the stock-feeding mechanism.

The gripping mechanism may employ two plates, blocks, or jaw members 30—31 having relatively extensive surfaces to face each other and to squeeze both sides of the tape 19. The lower jaw 30 is shown to be relatively fixed, except for a manual vertical adjustment permitted by use of the knob 32, for purposes of setting the gripping mechanism for use. The upper jaw block 31 is shown to be actuated by an air cylinder 33, to be operated in accordance with control effected by a valve 34. The valve 34 may be connected to a source of fluid pressure, as at an inlet 35; it may be actuated by a stem 36 riding on a cam follower 37 pivoted, say, at 38 to the frame of the machine 5, and following a cam 39 which may form part of the same cam means as the cam 24. The control effected by the valve 34 is preferably such as to produce selectively applied downward thrusts of the piston rod 40 of the cylinder 33 whenever the upper block 31 is to be clamped against the lower block 30 of the clamping mechanism 26. The designation 31 may be considered as a schematic representation of jaw means including a toggle or equivalent mechanism for applying, with increased mechanical advantage, the downwardly thrusting gripping forces derived from the cylinder 33. Upon relaxation of the downward thrust from cylinder 33, spring means (not shown) may be employed to assure complete relaxation of the grip between jaws 30—31.

Upon a proper setting of the cam means including cams 24 and 39, it will be appreciated that the valve 34 may effect a secure grip of the gripping mechanism 26 upon the tape 19 before a feeding advance is delivered by the cam follower 25. The grip may last for the full length of the feed stroke, so that the grip may thereby perform the added function of breaking the combined momentum of the stock 8 and of the pusher means 13, thereby assuring a desired feed-out distance for the stock 8. Under the circumstances, it will be understood that no stock stop may need be employed on the front or working face of the machine 5, and that more room may, therefore, be available for the use of forming and other tools (not shown). When the fed-out stock has been brought to a halt in the manner described, the cam 39 may be effective upon the valve 34 to cause a release of the grip between jaws 30—31, and the cam 24 may then cause a return or recycling stroke of the gripper mechanism, as guided by the guides 27. The cam 39 may then reset the grip in readiness for the next feeding cycle.

If desired, the feeding stroke, that is, the feed-out distance, may be adjustably selected within certain limits, as by a proper positioning of the roll 41 in a slotted portion 42 of the feed lever 28. The roll 41 in the form shown is carried by a block 43 which may be adjustably positioned in a slot, such as the dovetail or T slot 44, in the frame 45 of the gripping mechanism 26.

It will be seen that I have described a relatively simple stock-feeding mechanism that may be operated in timed relation with operation of the collet or chucking mechanism for the machine to be fed. The feeding mechanism assures positive and equal feed-out increments regardless of the usable unconsumed remainder of stock to be fed, and, if desired, no stock-stop mechanism need be employed on the machine which is being fed.

While I have described my invention in detail for the preferred form shown, it will be understood that modifications may be made within the scope of the invention as defined in the appended claims.

I claim:

1. In a stock-feeding mechanism, a frame including longitudinally extending guide means, pusher means slidably guided by said guide means, longitudinally spaced pulleys mounted on said frame and spanning a length of said guide means, a feed tape taut over said pulleys and secured to said pusher means, a positive clamp releasably engageable with said tape, actuating means for said clamp, and feed means reacting between said clamp and said frame for feeding said tape when said clamp is set, said feed means being characterized by a stroke following a dead start and terminated by a dead stop, said actuating means including a program synchronized with said feed means and timing a setting of said clamp at said dead start and therefore prior to a stroke of said feed means and a release of said clamp at said dead stop and therefore after a stroke of said feed means, whereby the feed imparted to said pusher means may be known to be directly related to the stroke of said feed means.

2. In a stock-feeding mechanism, a frame including elongated guide means, a stock pusher slidably guided by said guide means, longitudinally spaced pulleys journaled in said frame, a feed tape over said pulleys and including an elongated span with a part secured to said pusher, reciprocating feed means including a two-way-engaging direct-acting clutch releasably engageable with said tape, first actuating means for said feed means and including a feed program from a dead start and extending to a dead stop in the feeding direction, and second actuating means for said clutch and synchronized with said first actuating means, said second actuating means including a program timing the engagement of said clutch during said dead start and the disengagement of said clutch during said dead stop, whereby said clutch may be engaged and said pusher may be assuredly fed throughout the entire feeding stroke determined by said feed program.

3. A mechanism according to claim 2, in which said feed means includes a reciprocable slide carrying said clutch, and guide means for said slide and on said frame, said guide means being parallel to a stretch of said tape.

4. A stock-feeding mechanism according to claim 2, in which said reciprocable feed means includes adjustable means for adjustably determining the stroke thereof.

5. A stock-feeding mechanism according to claim 2, in which said pusher includes a positively engageable stock-gripping chuck, whereby there may be a known feed of stock for each stroke of said feed means, so that no stock stop need be employed on the machine to which said mechanism is applied.

6. In a stock-feeding mechanism, a frame, two longitudinally spaced pulleys journalled in said frame, a feed tape including a longitudinally extending stretch taut over said pulleys and in general alignment with a stock-feeding axis, a pusher including a positive stock-gripping chuck and clamped to said stretch of tape, slide means slidably guided on said frame in a path generally parallel with another stretch of said tape, a two-way engageable clutch carried by said slide means and releasably engageable with said other stretch of tape, actuating means for said clutch and including a program characterized by a clutch engagement followed by a period terminated by clutch disengagement, and reciprocable feed means for said slide means, said feed means including a feed program synchronized with said actuating means and characterized by a dead start coincident with clutch engagement and a feed stroke and a dead stop coincident with clutch disengagement.

7. In a stock-feeding mechanism, a frame, two longitudinally spaced pulleys journalled in said frame, an endless tape taut between said pulleys so as to define two longitudinal stretches of tape, a pusher including a positive stock-gripping chuck and clamped to one of said stretches of tape, slide means slidably guided on said frame in a path generally parallel to and alongside the other stretch of tape, a fluid-pressure actuated two-way engaging clamp carried by said slide means and positively engageable with said other stretch, a camshaft, fluid-pressure control means for said clamp and including a cam on said camshaft, and reciprocable feed means for said slide means and including a feed member driven by said camshaft, said feed means including a program characterized by a dead start coincident with clutch engagement and a feed stroke and a dead stop coincident with clutch disengagement.

DONALD H. MONTGOMERY.

REFERENCES CITED

The following references are of record in the file of this patent:

UNITED STATES PATENTS

| Number | Name | Date |
|---|---|---|
| 434,204 | Rothlisberger | Aug. 12, 1890 |
| 497,631 | Conradson | May 16, 1893 |
| 2,108,274 | Tautz et al. | Feb. 15, 1938 |
| 2,301,906 | Miller et al. | Nov. 10, 1942 |
| 2,389,556 | Siegerist | Nov. 20, 1945 |